US008677437B2

(12) United States Patent
Wei

(10) Patent No.: US 8,677,437 B2
(45) Date of Patent: Mar. 18, 2014

(54) SYSTEMS AND METHODS FOR CALCULATING THE DELAY BETWEEN MEDIA SIGNALS

(75) Inventor: Jeff Wei, Richmond Hill (CA)

(73) Assignee: Evertz Microsystems Ltd., Burlington (CA)

( * ) Notice: Subject to any disclaimer, the term of this patent is extended or adjusted under 35 U.S.C. 154(b) by 1314 days.

(21) Appl. No.: 12/116,445

(22) Filed: May 7, 2008

(65) Prior Publication Data

US 2009/0282452 A1    Nov. 12, 2009

(51) Int. Cl.
*H04N 5/04* (2006.01)

(52) U.S. Cl.
USPC ........... 725/118; 348/512; 348/515; 348/518; 348/500; 375/130; 375/135; 375/227; 370/468

(58) Field of Classification Search
USPC .......... 375/240.29, 130, 135, 227; 348/14.08, 348/125, 180, 515, 572, 201, 512, 518, 348/500; 370/468; 725/118
See application file for complete search history.

(56) References Cited

U.S. PATENT DOCUMENTS

| | | | |
|---|---|---|---|
| 5,530,483 A | 6/1996 | Cooper et al. | |
| 5,751,368 A | 5/1998 | Cooper | |
| 6,330,033 B1 | 12/2001 | Cooper | |
| 6,351,281 B1 | 2/2002 | Cooper | |
| 6,584,138 B1 * | 6/2003 | Neubauer et al. | 375/130 |
| 6,836,295 B1 | 12/2004 | Cooper | |
| 7,710,499 B2 | 5/2010 | Cooper | |
| 8,159,610 B2 | 4/2012 | Cooper | |
| 8,174,558 B2 * | 5/2012 | Smith et al. | 348/14.08 |
| 2003/0063219 A1 * | 4/2003 | Bellers | 348/572 |
| 2006/0078305 A1 * | 4/2006 | Arora et al. | 386/96 |
| 2007/0291832 A1 * | 12/2007 | Diab et al. | 375/227 |

* cited by examiner

*Primary Examiner* — Charles C Jiang
*Assistant Examiner* — Jamal Javaid
(74) *Attorney, Agent, or Firm* — Bereskin & Parr LLP/S.E.N.C.R.L., s.r.l.

(57) ABSTRACT

The embodiments described herein provide a method and system for determining the extent to which a plurality of media signals are out of sync with each other. The method includes: receiving a first input media signal and a second input media signal wherein the first and second input media signals are in sync with each other; extracting at least one first characteristic feature from the first input media signal; extracting at least one second characteristic feature from the second input media signal; receiving a first output media signal and a second output media signal wherein the first output signal corresponds to the first input media signal after being transmitted through a network, and the second output signal corresponds to the second input media signal after being transmitted through the network; extracting the at least one first characteristic feature from the first output media signal; extracting the at least one second characteristic feature from the second output media signal; calculating a first signal delay based on the at least one first characteristic feature extracted from the first input and output media signals; calculating a second signal delay based on the at least one second characteristic feature extracted from the second input and output media signals; and outputting a synchronization signal based on the difference between the first and second delay signals wherein the synchronization signal represents the extent to which the first and second output media signals are out of sync with each other.

32 Claims, 6 Drawing Sheets

SYSTEMS AND METHODS FOR CALCULATING THE DELAY BETWEEN MEDIA SIGNALS

FIELD

The described embodiments relate to communication systems. More particularly, the described embodiments relate to systems and methods for calculating the delay between media signals such as video and audio signals after they have traversed a network.

BACKGROUND

In many entertainment and other communication systems, it is desirable to synchronize media signals such as audio and video signals. Typically, such signals are initially generated or provided by an audio/video source (i.e. a video tape player, a DVD player or set-top television decoder) in a pair (or more) of time synchronized signals. The audio and video signals may then be processed and transmitted to an audio/video destination (i.e. a television) via different transmission paths that typically include signal processing equipment and transmission links. As a result of different delays in the different transmission paths, the signals may become out of sync with one another. This is often referred to as the "lip sync" problem. The word "sync" is commonly used in this context as a short form for "synchronization".

There are several existing methods for measuring and correcting "lip sync" errors including side information embedding, test signal generation and detection, and end of path checking. In some implementations of the side information embedding method a system embeds timing data in each of the media signals. The timing data may consist of time code or sequence numbers that are embedded in the coded media signals and/or in the media stream encapsulating the coded media signals. In other implementations, side information consisting of random or pseudo-random data is embedded in a side field in the media signal (e.g. VBI of uncompressed video) or as a watermark in the media content of the signal. Synchronization errors can then be detected by correlating the embedded data at the destination.

In the test signal generation and detection method, test signals are generated at the source. These signals usually contain pulses or transitions of certain patterns that are synchronized to each other. Then at the destination, the amount of time skew between the pulses or transitions from different media signals is detected to determine the amount of synchronization error.

In the end of path checking method, the two or more media signals are compared at the destination and the synchronization error is estimated and corrected. For example, by correlating spoken audio with moving lips, one may calculate the amount of delay between audio and video.

Each of these existing methods has various limitations. For example, in the side information embedding method, the side information may be dropped or corrupted in the path, and if the side information is watermarked, it may corrupt the content of the media signal. The test signal generation and detection method can only be used when the system is not in service and accordingly, if there is a delay change in the path when in service, then the synchronization would be incorrect until the next out-of-service check. One limitation of the end of path checking method is that it is limited to certain types of content, such as video containing facial movements and audio containing the corresponding speech.

Accordingly, there is a need for a method for measuring and correcting "lip sync" errors that can be done in-service, is non-intrusive and works with many types of media signals and transmission paths. Similarly, there is a need for a system that implements such a method.

SUMMARY

The embodiments described herein provide in one aspect a method of determining the extent to which a plurality of media signals are out of sync with each other. The method includes receiving a first input media signal and a second input media signal wherein the first and second input media signals are in sync with each other; extracting at least one first characteristic feature from the first input media signal; extracting at least one second characteristic feature from the second input media signal; receiving a first output media signal and a second output media signal wherein the first output signal corresponds to the first input media signal after being transmitted through a network, and the second output signal corresponds to the second input media signal after being transmitted through the network; extracting the at least one first characteristic feature from the first output media signal; extracting the at least one second characteristic feature from the second output media signal; calculating a first signal delay based on the at least one first characteristic feature extracted from the first input and output media signals; calculating a second signal delay based on the at least one second characteristic feature extracted from the second input and output media signals; and outputting a synchronization signal based on the difference between the first and second delay signals wherein the synchronization signal represents the extent to which the first and second output media signals are out of sync with each other.

The embodiments described herein provide in another aspect a system for determining the extent to which a plurality of media signals are out of sync with each other. The system includes a first input port for receiving a first input media signal; a second input port for receiving a second input media signal wherein the first and second input signals are in sync with each other; a first input characteristic feature extraction module for extracting at least one first characteristic feature from the first input media signal; a second input characteristic feature extraction module for extracting at least one second characteristic feature from the second input media signal; a network for transporting the first and second input media signals from a first location to a second location to produce a first output media signal corresponding to the first input media signal and a second output media signal corresponding to the second input media signal; a first output characteristic feature extraction module for extracting the at least one first characteristic feature from the first output media signal; a second output characteristic feature extraction module for extracting the at least one second characteristic feature from the second output media signal; a first delay calculation module for generating a first signal delay from the at least one first characteristic feature extracted from the first input and output media signals wherein the first delay signal represents a time delay between the first input and output media signals; a second delay calculation module for generating a second signal delay from the at least one second characteristic feature extracted from the second input and output media signals wherein the second delay signal represents a time delay between the second input and output media signals; and a synchronization error module for outputting a synchronization signal based on the first and second signal delays wherein the synchronization signal represents the extent to which the first and second output media signals are out of sync with each other.

Further aspects and advantages of the embodiments described will appear from the following description taken together with the accompanying drawings.

BRIEF DESCRIPTION OF THE DRAWINGS

For a better understanding of embodiments of the systems and methods described herein, and to show more clearly how they may be carried into effect, reference will be made, by way of example, to the accompanying drawings in which.

Figure 1:
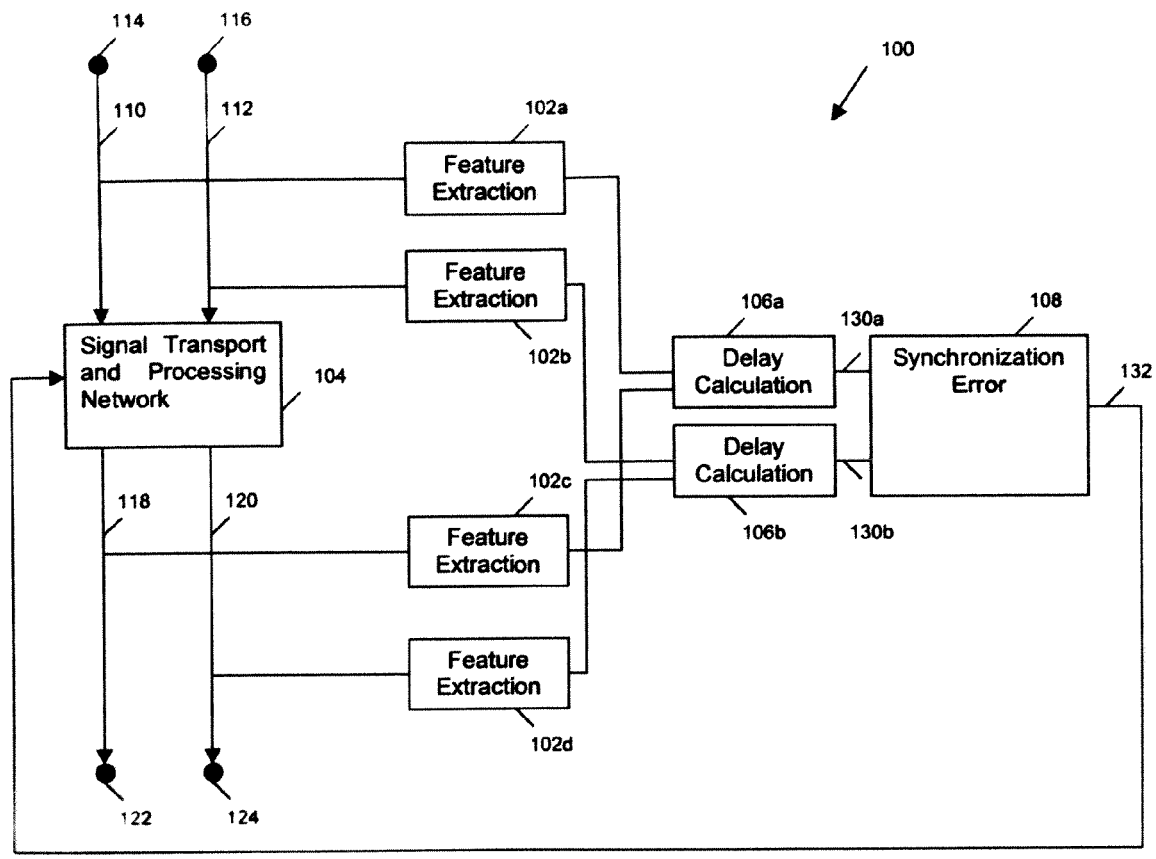
FIG. 1 is a block diagram of a system for determining the extent to which two media signals are out of sync with each other in accordance with at least one embodiment.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various exemplary embodiments described herein.

Reference is now made to FIG. 1, in which a system 100 for determining the extent to which two media signals are out of sync with each other in accordance with an embodiment is illustrated. The system 100 includes four feature extraction modules 102a, 102b, 102c and 102d, a signal transport network 104, two delay calculation modules 106a and 106b and a synchronization error module 108.

Two input media signals 110 and 112 are input into the system 100 at input terminals 114 and 116. Typically, the input media signals 110 and 112 are reproduced continuously and are synchronized such that corresponding portions of each signal are reproduced at about the same time. The input terminals 114 and 116 are coupled to a feature extraction module 102a and 102b, and also to the signal transport network 104. The input media signals 110 and 112 are transported through the signal transport network 104 and output as output media signals 118 and 120 respectively to output terminals 122 and 124.

In this embodiment, the first and second input media signals 110 and 112 are media signals such as video, audio or video/audio signals. For example, the first input media signal 110 may be a video signal and the second input media signal 112 may be an associated audio signal. Typically, the video signal and the audio signal are synchronized such that the audible contents of the audio signal are synchronized with the visual contents of the video signal. For example, the audio and video signals may be produced by an audio/video source such as a live video/audio capture module, a video tape player, a video server, a DVD player or a set-top television decoder.

The signal transport network 104 will typically include audio and video signal transportation devices which transport the input media signals 110 and 112 from one point to another. The signal transport network 104 may also include audio and video processing devices (i.e. a decoder, an MPEG compressor, a video standard converter) which modify the media signals 110 and 112. Where the signal transport network 104 includes processing devices, the output media signals 118, 120 may be different than the corresponding input media signals 110, 112. For example, an MPEG compressor introduces compression artifacts in a video signal and a video standard converter changes the video size and/or frame rate of the video signal. Typically, the first and second input media signals 110 and 112 will travel through different transmission paths through the signal transport network 104, although this is not necessary.

For example, where the first input media signal 110 is a video signal, it may travel through various devices including a composite decoder, an MPEG compressor, a transport stream multiplexer, a transport link, a transport stream de-multiplexer, an MPEG de-compressor or a composite encoder. The transport link may include an uplink modulator, a ground to satellite link, a satellite to ground link and a satellite receiver. Each of the processing units (i.e. the MPEG compressor, transport stream multiplexer) and the transport link will introduce a certain amount of delay so that the first output media signal 118 will be a delayed version of the first input media signal 110.

Similarly, where the second input media signal 112 is an audio signal, it may travel the through an audio dynamic range processor, an audio compressor, a transport stream multiplexer, a transport link, a transport stream de-multiplexer and an audio de-compressor. Each of these processing units will also introduce delay so that the second output media signal 120 will be a delayed version of the second input media signal 112. The delay in the first output media signal 118 will typically be different from the delay in the second output media signal 120, with the result that the first and second output media signals 118 and 120 will not be synchronized when they reach the output terminals 122 and 124.

The feature extraction modules 102a, 102b, 102c and 102d, the delay calculation modules 106a, 106b and the synchronization error module 108 operate to determine the extent to which the two output media signals 118 and 120 have become unsynchronized. Specifically, each of the feature extraction modules 102a, 102b, 102c, 102d extracts at least one characteristic feature of the input and output media signals 110, 112, 118 and 120. The delay calculation modules 106a and 106b determine the amount of delay between corresponding input and output signals (e.g. 110, 118; 112, 120) from the extracted characteristic feature data; and the synchronization error module 108 determines the difference between the two delays and provides the synchronization error 132 corresponding to the difference.

Feature extraction module 102a extracts one or more characteristic features of the first input media signal 110. Feature extraction module 102b extracts one or more characteristic features of the second input media signal 112. Feature extraction module 102c extracts one or more characteristic features of the first output media signal 118. Feature extraction module 102d extracts one or more characteristic features of the second output media signal 120.

Figure 2:
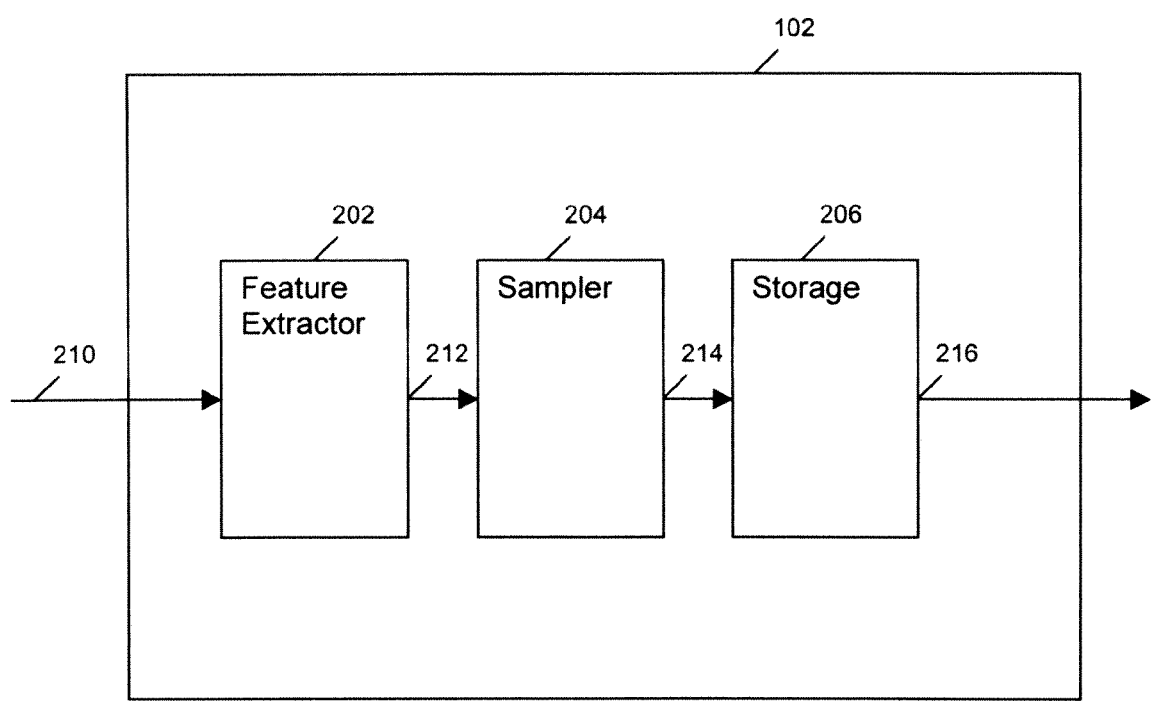
FIG. 2 is a block diagram of the feature extraction module of FIG. 1 in accordance with one embodiment.

Reference is now made to FIG. 2, which is a block diagram of an example feature extraction module 102. The feature extraction module 102 includes a feature extractor 202, a sampling module 204 and a storage module 206.

The feature extractor 202 receives as an input a media signal 210 (such as input media signal 110 or 112) and extracts one or more characteristic features from the media signal 210 and outputs a feature signal 212. Depending on the characteristic feature used, the feature signal 212 may be a continuous time varying signal or a set of discrete values.

A characteristic feature of a media signal is a feature that varies over time. Various aspects of a media signal may be used as characteristic features and aspects that have a pattern that is not easily varied or corrupted by the processing in the network 104 are preferred. Where the media signal 210 is an audio signal, one or more of the following may be used as a characteristic features: the envelope of audio signal amplitude, the average loudness level, the peak formant of the audio signal and the average zero crossing rate. Where the media signal 210 is a video signal, one or more of the following may be used as a characteristic features: the average luma or color value, the average motion distance, and the contrast level of the signal. Other aspects of the audio and video signals could also be used as a characteristic feature.

The sampling module 204 receives the feature signal 212 from the feature extractor 202, samples it at a predetermined sampling frequency, $f_s$, and outputs the sampled feature data 214. As noted above, in system 100 there are four feature extraction modules 102a, 102b, 102c, and 102d—one for each of the input and output media signals 110, 112, 118 and 120. The sampling frequency of the four feature extraction modules 102a, 102b, 102c, and 102d need not be the same. The sampling frequency, $f_s$, may be different for different types of media signals. For example, there may be one sampling frequency for video signals and a different sampling frequency for audio signals. The sampling frequency, $f_s$, may also be different between corresponding input and output signals. For example, the sampling frequency for the first input media signal 110 may be different than the sample frequency for the first output media signal 118.

In general, the sampling frequency is proportional to the accuracy of the synchronization error. The higher the sampling frequency the more accurate the calculated synchronization error. However, a higher sampling frequency may also increase the amount of storage and processing required.

In one embodiment, the sampling frequency, $f_s$, is set to the video frame frequency of the video signal. The frame frequency (or frame rate) is the frequency at which an imaging device produces unique successive images or frames. Since a lip sync error of plus or minus 1 video frame is not usually noticeable, a sampling frequency equal to the video frame frequency produces synchronization error at precision of around 1 video frame period, and this is usually sufficient.

The storage module 206 receives the sampled feature data 214 output by the sampling module 204 and stores the most recent T seconds of the sampled feature data 214. The storage module 206 is continuously updated by the sampling module 204 and can be generally described as a first-in-first-out (FIFO) buffer.

The time period, T, is typically chosen to be greater than the longest expected delay of the media signals (e.g. 110 and 112) through the network 104. In some embodiments, T is chosen to be twice as long as the expected maximum delay, or even longer.

The time period T may be different for corresponding input and output media signals (e.g. first input media signal 110 and first output media signal 118). In one embodiment the time period T for the output media signal is smaller than the time period T for the corresponding input media signal.

Figure 3:
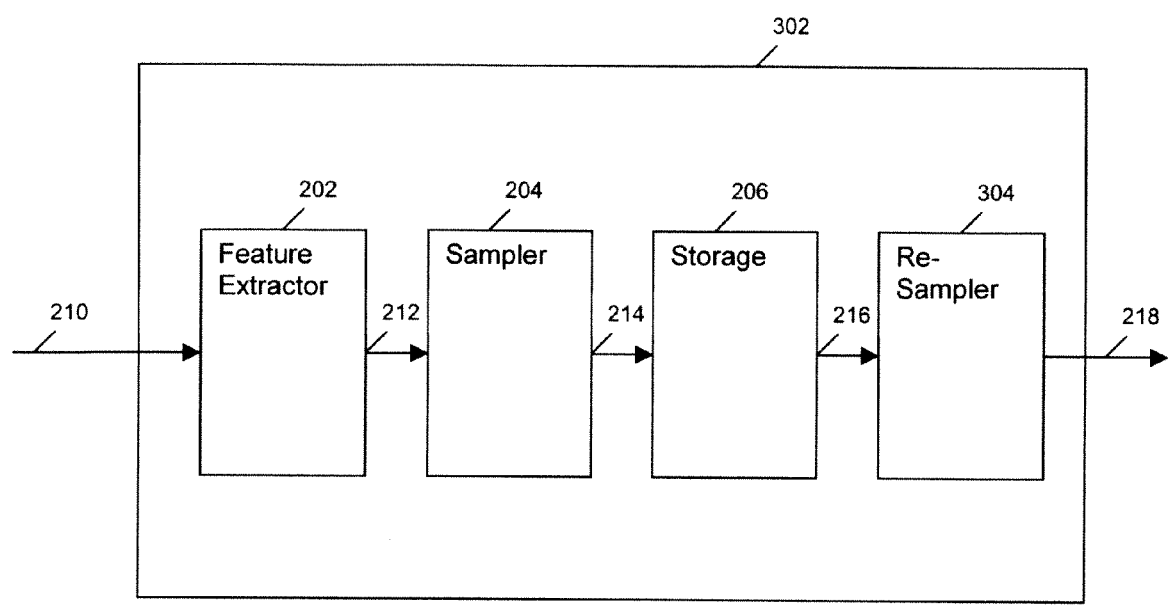
FIG. 3 is a block diagram of the feature extraction module of FIG. 1 in accordance with another embodiment.

Reference is now made to FIG. 3, in which a block diagram of a generic feature extraction module 302 in accordance with an alternative embodiment is illustrated. The feature extraction module is identical to feature extraction module 102 of FIG. 2 except that it also includes a re-sampling module 304.

In some situations it is preferable that the sampling rates for corresponding input and output media signals (e.g. 110 and 118) be the same. Accordingly, the feature extraction module 302 may also include a re-sampling module 304. The re-sampling module 304 re-samples the stored feature data at a different sampling frequency, $f_r$, than the sampling frequency, $f_s$, used by the sampling module 204. The re-sampling module 304 may be used when corresponding input and output media signals (e.g. 110 and 118) are initially sampled at different sampling frequencies. For example, if the input media signal feature data were sampled at 24 Hz and the corresponding output media signal feature data were sampled at 30 Hz, then both the input and output media signal feature data can be re-sampled at 120 Hz, or alternatively the input media signal feature data may be resampled at 30 Hz. Resampling module can also be used to resample the feature data at a higher sampling frequency so as to improve the accuracy of lip sync error produced.

The stored feature data for corresponding input and output media signals is retrieved by a delay calculation module 106 to determine the delay between corresponding input and output media signals (e.g. first input media signal 110 and first output media signal 118). In system 100 there are two delay calculation modules 106a and 106b, the first delay calculation module 106a uses the extracted feature data generated by feature extraction modules 102a and 102c for the first input media signal 110 and the first output media signal 118 to determine the delay caused to the first input media signal 110 by the network 104; and the second delay calculation module 106b uses the extracted feature data generated by the feature extraction modules 102b and 102d for the second input media signal 112 and the second output media signal 120 to determine the delay caused to the second input media signal 112 by the network 104.

In systems where it is known that the characteristic features of the input media signals 110 and 112 will not be altered as they traverse the network 104, then basic matching methods may be used to determine the delay from the extracted feature data. An example of a basic matching method is the simple sliding technique where one feature data set is essentially slid along and compared to the second feature data set to determine a match. A match occurs when the sum of the absolute difference between the two sets of data is at a minimum.

Figure 4:
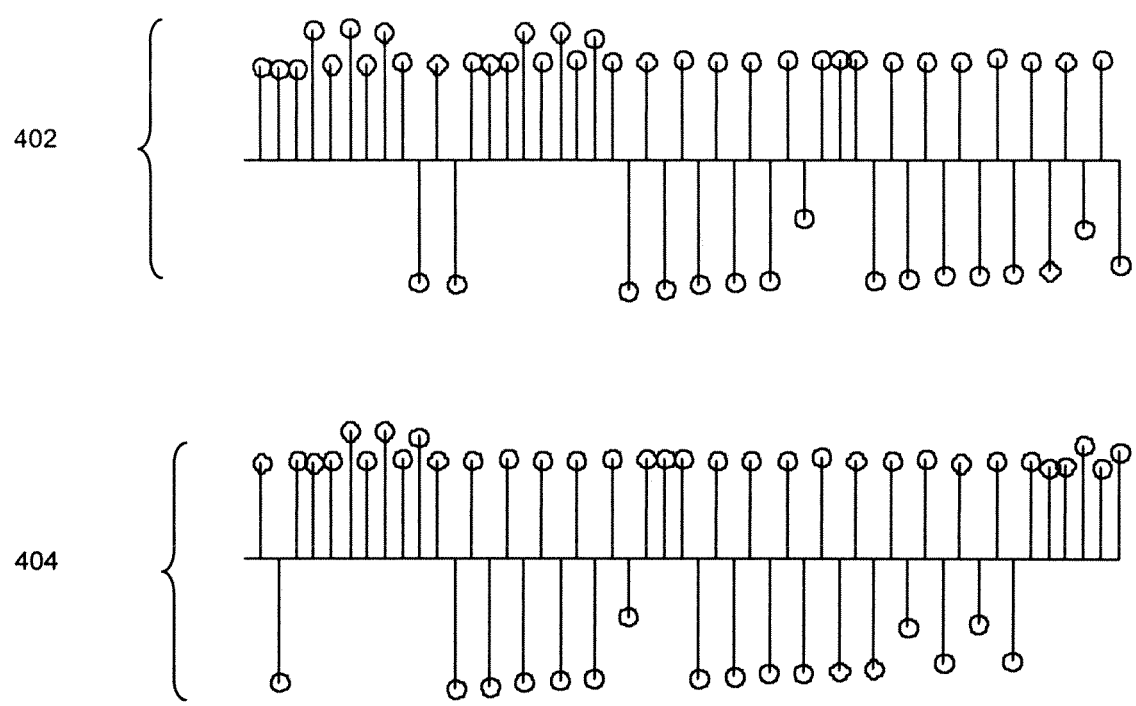
FIG. 4 is a chart illustrating a method of determining the delay between two signals using a simple sliding technique.

Reference is now made to FIG. 4, which illustrates the simple sliding technique referred to above. The first sequence 402 comprises fifty samples and represents a first feature data set. The second sequence 404 also comprises 50 samples and represents a second feature data set which is a delayed version of the first feature data set. Using the simple sliding technique the first sequence 402 is shifted to the right one sample at a time until a match is found. It can be seen from FIG. 4 that the first and second sequences 402, 404 will "match" when the first sequence 402 is shifted to the right 10 samples. Accordingly, the delay between the first and second sequences 402 and 404 is equivalent to 10 samples.

However, in systems where it is possible that the characteristic features of the input media signals 110 and 112 will be altered as they traverse the network 104, then more sophisticated matching methods, such as cross-correlation, may be used.

Figure 5:
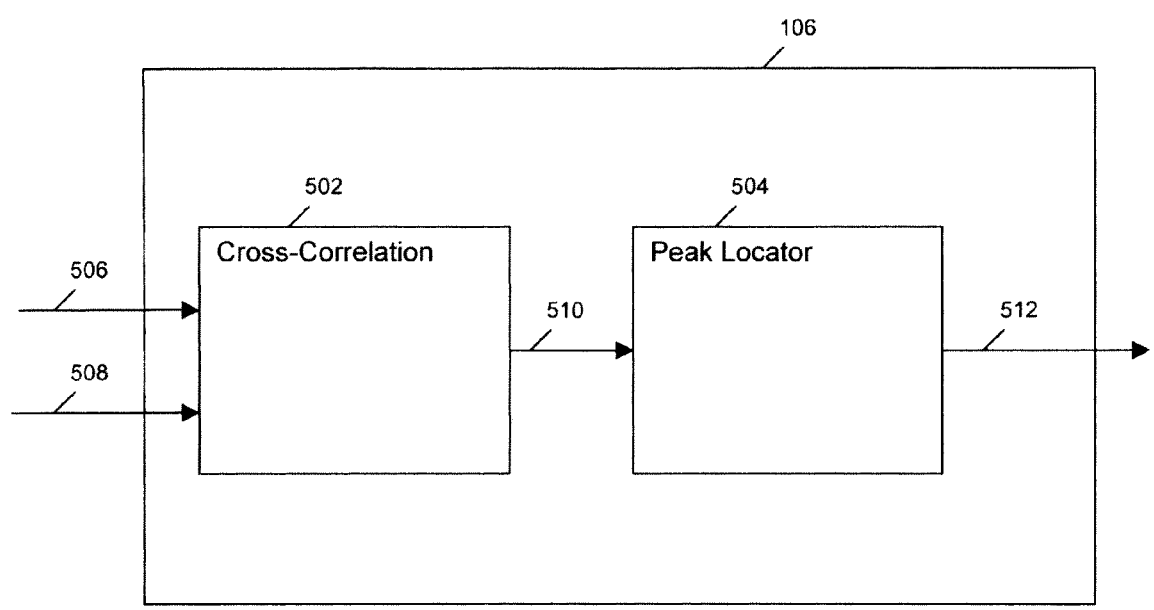
FIG. 5 is a block diagram of the delay calculation module of FIG. 1 in accordance with at least one embodiment.

Reference is now made to FIG. 5, in which a block diagram of a generic delay calculation module 106 in accordance with an embodiment is illustrated. The delay calculation module 106 includes a cross-correlation module 502 and a peak locator module 504.

The cross-correlation module 502 accepts as inputs a sampled feature data set 506 for an input media signal (e.g. 110) and a sampled feature data set 508 for the corresponding output media signal (e.g. 118). The cross-correlation module 502 may retrieve the inputs (506 and 508) from the relevant feature extraction modules 102 or the feature extraction modules 102 may send the inputs to the cross-correlation module 502. The cross-correlation module 502 then performs cross correlation on the sampled feature data sets 506 and 508 and outputs a set of cross-correlation values 510. Cross-correlation is a measure of the similarity of two signals, f(x) and g(x), and is defined by equation (1) where the integral is over the appropriate values of t and a superscript asterisk indicates the complex conjugate.

$$(f*g)(x) = \int f^*(t)g(x+t)dt \quad (1)$$

Cross-correlation works by essentially sliding one signal along the x-axis of the other signal, and calculating the integral of the product of the two signals for each possible amount of sliding. The integral is maximized when the functions match.

Where the signals are discrete functions, $f_i$ and $g_i$, the cross-correlation is defined by equation (2) where the sum is over the appropriate values of the integer j.

$$(f*g)_i = \sum_j f_j^* g_{i+j} \quad (2)$$

Where the first discrete function, $f_i$, has $N_1$ discrete values and the second discrete function, $g_i$, has $N_2$ discrete values then $N_1 + N_2 - 1$ cross-correlation values can be generated.

The cross-correlation module 502 may be implemented in the time domain, or in the frequency domain using a discrete fourier transform (DFT).

The set of cross-correlation values 510 output by the cross-correlation module 502 are input to the peak locator 504. The peak locator 504 determines the peak position from the set of cross-correlation values 510. The peak position is the position at which characteristic features of corresponding input and output media signals have the best match. The peak locator 504 then determines the delay between corresponding input and output media signals (e.g. 110 and 118) based on the peak position. The delay is equal to the peak position divided by the sampling rate of the feature data. Accordingly, the accuracy of the peak position is directly proportional to the sampling frequency $f_s$. The higher the sampling frequency, the more accurate the peak position.

In one embodiment the accuracy of the peak position is increased by re-sampling the feature data at a sampling frequency, $f_r$, greater than the original sampling frequency, $f_s$, prior to cross-correlation.

In another embodiment, the accuracy of the peak position is increased by determining the peak position from the peak value and the values surrounding the peak value. For example, the peak position may be determined using interpolation such as linear interpolation or parabolic interpolation.

Figure 6:
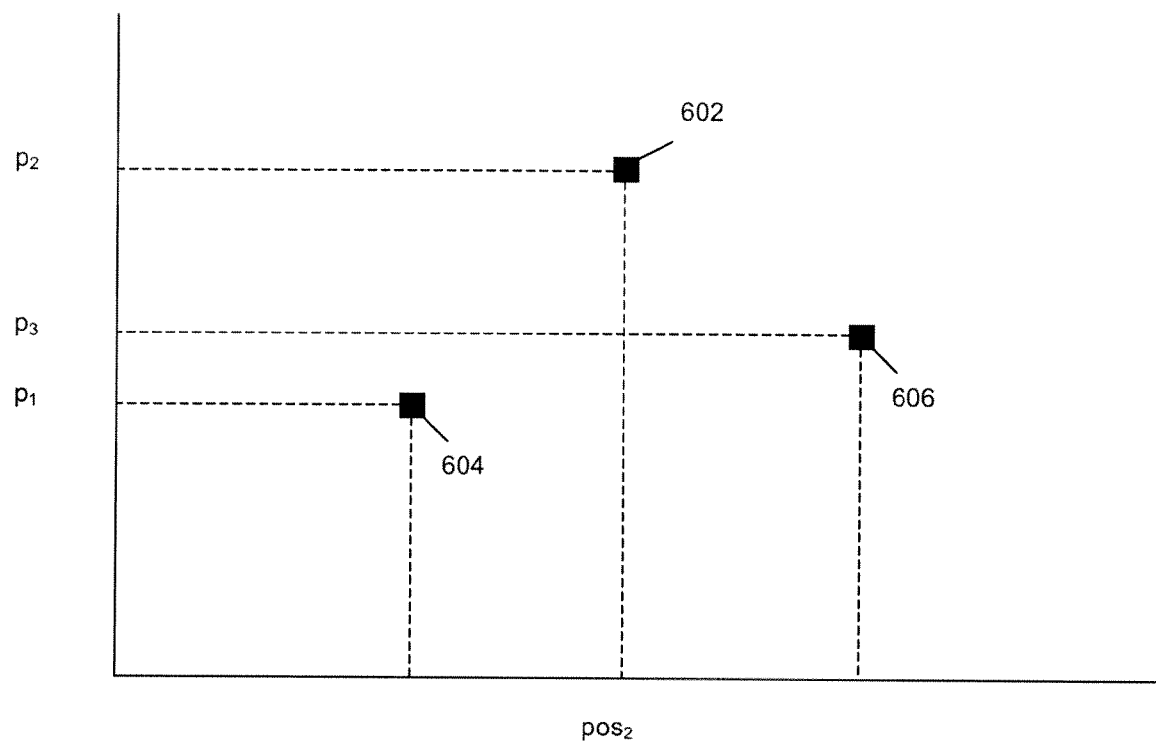
FIG. 6 is a chart illustrating a method of determining the peak position using linear interpolation in accordance with an embodiment.

Reference is now made to FIG. 6, in which a method of determining the peak position using linear interpolation in accordance with an embodiment is illustrated. The peak 602 of the cross correlation values has an amplitude $p_2$ and a position $pos_2$. The cross-correlation value immediately proceeding the peak 604 has an amplitude $p_1$, and the cross-correlation value immediately following the peak 606 has an amplitude $p_3$. A more accurate peak position, $pos_A$, can be determined according to equation (3) when $p_3$ is greater than or equal to $p_1$, and according to equation (4) in all other cases.

$$pos_A = pos_2 + \frac{(p_1 - p_3)}{(p_2 - p_1)} * \frac{1}{2} \quad (3)$$

$$pos_A = pos_2 + \frac{(p_1 - p_3)}{(p_2 - p_3)} * \frac{1}{2} \quad (4)$$

In some cases the peak locator 504 may incorrectly identify the peak position. This may occur, for example, where the cross-correlation is poor due to feature corruption caused by the network 104 or the nature of the feature data itself. Another example in which an incorrect peak position may be identified is where the input media signal (e.g. 110) and its corresponding output media signal (e.g. 118) match at multiple positions. In this case there will be multiple peaks in the cross-correlation values, and the highest of these peaks may not accurately represent the delay between the input and output signals (e.g. 110 and 118). To eliminate possible false peaks, in some embodiments the peak locator 504 implements thresholding. For example, a peak may be eliminated from consideration if the cross-correlation value at the peak is lower than a predetermined percentage of the product of the total cross-correlation values from the input and output media signals (e.g. 110 and 118). In one embodiment the predetermined percentage is 5%.

The synchronization error module 108 receives two delay inputs 130a and 130b and outputs a synchronization error signal 132 which is the difference between the two delay inputs 130a and 130b. The synchronization error signal 132 is fed to the network 104 where it is used to correct the synchronization error. The synchronization error can be corrected by adding a delay to the path that has the shorter delay, and/or reducing the delay to the path that has the longer delay.

In some embodiments the feature extraction module 102 further includes a processing module. The processing module processes the feature data to improve cross-correlation. For example, the processing module may be a differentiator or may be a combination of a differentiator and a logarithmic module. The processing module may be situated between the sampler 204 and the storage module 206 or alternatively it may be situated after the storage module 206.

In some embodiments system 100 is used to generate the synchronization error once and in other embodiments the synchronization error is generated periodically. Where the synchronization error is generated on a periodic basis, the peak locator 504 and the synchronization error module 108 may both further include a filter for smoothing the peak position output and the synchronization error output respectively. The filters may be moving average filters.

System 100 has been described in the context of synchronizing two media signals 110 and 112. However, in other embodiments three or more media signals are synchronized by extracting the characteristic features of each media signal at the input and output of the network 104 and detecting the delay of each media signal.

While the above description provides examples of various embodiments of the invention, it will be appreciated that some features and/or functions of the described embodiments are susceptible to modification without departing from the spirit and principles of operation of the described embodiments. What has been described above has been intended to be illustrative of the invention and non-limiting and it will be understood by persons skilled in the art that other variants and modifications may be made without departing from the scope of the invention as defined in the claims appended hereto.

The invention claimed is:

1. A method of determining the extent to which a plurality of media signals are out of sync with each other, the method comprising:
   receiving a first input media signal and a second input media signal wherein the first and second input media signals are in sync with each other, and wherein the first input media signal is a video signal and the second input media signal is an audio signal corresponding to the video signal;
   extracting at least one first characteristic feature from the first input media signal, the at least one first characteristic feature extracted from the first input media signal being a time-varying characteristic of the video signal;
   extracting at least one second characteristic feature from the second input media signal, the at least one second characteristic feature extracted from the second input media signal being a time-varying characteristic of the audio signal;
   receiving a first output media signal and a second output media signal wherein the first output media signal corresponds to the first input media signal after traversing a network, and the second output media signal corresponds to the second input media signal after traversing the network;
   extracting the at least one first characteristic feature from the first output media signal;
   extracting the at least one second characteristic feature from the second output media signal;
   calculating a first signal delay based on the at least one first characteristic feature extracted from the first input and output media signals;
   calculating a second signal delay based on the at least one second characteristic feature extracted from the second input and output media signals; and
   outputting a synchronization signal based on the difference between the first and second delay signals wherein the synchronization signal represents the extent to which the first and second output media signals are out of sync with each other.

2. The method of claim 1 wherein the at least one first characteristic feature extracted from the first input and output media signals includes at least one characteristic selected from the group consisting of: average luma value, average color value, average motion distance and contrast level.

3. The method of claim 2 wherein the at least one second characteristic feature extracted from the second input and output media signals includes at least one characteristic selected from the group consisting of: an envelope of signal amplitude, an average loudness level, a peak formant and average zero crossing rate.

4. The method of claim 1 wherein extracting the at least one first characteristic feature from the first input media signal comprises:
   extracting the at least one first characteristic feature from the first input media signal to produce a first input characteristic feature;
   sampling the first input characteristic feature at a first input sampling frequency to produce first input characteristic feature samples; and
   storing the first input characteristic feature samples.

5. The method of claim 4 wherein extracting the at least one first characteristic feature from the first input media signal further comprises re-sampling the first input characteristic feature samples at a second input sampling frequency.

6. The method of claim 5 wherein the first input sampling frequency is less than the second input sampling frequency.

7. The method of claim 5 wherein extracting the at least one first characteristic feature from the first output media signal comprises:
   extracting the at least one first characteristic feature from the first output media signal to produce a first output characteristic feature;
   sampling the first output characteristic feature at a first output sampling frequency to produce first output characteristic feature samples; and
   storing the first output characteristic feature samples.

8. The method of claim 7 wherein extracting at least one first characteristic feature from the first output media signal further comprises re-sampling the first output characteristic feature samples at a second output sampling frequency.

9. The method of claim 8 wherein the first output sampling frequency is less than the second output sampling frequency.

10. The method of claim 8, wherein the second input sampling frequency is equal to the second output sampling frequency.

11. The method of claim 1 wherein calculating the first signal delay comprises comparing the at least one first characteristic feature extracted from the first input media signal with the at least one first characteristic feature extracted from the first output media signal.

12. The method of claim 11 wherein comparing the at least one first characteristic feature extracted from the first input media signal with the at least one first characteristic feature extracted from the first output media signal comprises:
   cross correlating the at least one first characteristic feature extracted from the first input media signal with the at least one characteristic feature extracted from the first output media signal to produce a set of cross-correlation values;
   determining a peak from the set of cross-correlation values; and
   generating a first signal delay wherein the first signal delay is based on the peak.

13. The method of claim 12 wherein determining the peak from the set of cross-correlation values comprises discarding peaks that do not meet a predetermined threshold.

14. The method of claim 12 wherein the peak is determined through interpolation.

15. The method of claim 14 wherein the peak is determined through linear interpolation.

16. The method of claim 14 wherein the peak is determined through parabolic interpolation.

17. A system for determining the extent to which a plurality of media signals are out of sync with each other, the system comprising:
   a first input port for receiving a first input media signal, the first input media signal being a video signal;

a second input port for receiving a second input media signal, the second input media signal being an audio signal corresponding to the video signal, and wherein the first and second input signals are in sync with each other;

a first input characteristic feature extraction module for extracting at least one first characteristic feature from the first input media signal, the at least one first characteristic feature extracted from the first input media signal being a time-varying characteristic of the video signal;

a second input characteristic feature extraction module for extracting at least one second characteristic feature from the second input media signal, the at least one second characteristic feature extracted from the second input media signal being a time-varying characteristic of the audio signal;

a network for transporting the first and second input media signals from a first location to a second location to produce a first output media signal corresponding to the first input media signal and a second output media signal corresponding to the second input media signal;

a first output characteristic feature extraction module for extracting the at least one first characteristic feature from the first output media signal;

a second output characteristic feature extraction module for extracting the at least one second characteristic feature from the second output media signal;

a first delay calculation module for generating a first signal delay from the at least one first characteristic feature extracted from the first input and output media signals wherein the first delay signal represents a time delay between the first input and output media signals;

a second delay calculation module for generating a second signal delay from the at least one second characteristic feature extracted from the second input and output media signals wherein the second delay signal represents a time delay between the second input and output media signals; and a synchronization error module for outputting a synchronization signal based on the first and second signal delays wherein the synchronization signal represents the extent to which the first and second output media signals are out of sync with each other.

18. The system of claim 17 wherein the first input characteristic feature extraction modules comprises:
  a feature extractor for extracting at least one first characteristic feature from the first input media signal to produce a first input characteristic feature; and
  a sampler for sampling the first input characteristic feature at a first input sampling frequency to produce first input characteristic feature samples.

19. The system of claim 18 wherein the first input characteristic feature extraction module further comprises a storage module for storing first input characteristic feature samples.

20. The system of claim 18 wherein the first input characteristic feature extraction modules further comprises a re-sampler for sampling the first input characteristic samples at a second input sampling frequency.

21. The system of claim 20 wherein the second input sampling frequency is greater than the first input sampling frequency.

22. The system of claim 20 wherein the first output characteristic feature extraction module comprises:
  a feature extractor for extracting at least one characteristic feature from the output media signal to produce a first output characteristic feature; and
  a sampler for sampling the first output characteristic feature at a first output sampling frequency to produce first output characteristic feature samples.

23. The system of claim 22 wherein the first output characteristic feature extraction module further comprises a storage module for storing the first output characteristic feature samples.

24. The system of claim 22 wherein the first output characteristic feature extraction module further comprises a re-sampler for sampling the first output characteristic feature samples at a second output sampling frequency.

25. The system of claim 24 wherein the second output sampling frequency is greater than the first sampling output frequency.

26. The system of claim 24 wherein the second output sampling frequency is equal to the second input sampling frequency.

27. The system of claim 18, wherein the first input characteristic feature extraction modules further comprises a processing module for processing the first input characteristic samples.

28. The system of claim 27, wherein the processing module comprises a differentiator.

29. The system of claim 28, wherein the processing module further comprises a logarithmic module.

30. The system of claim 17 wherein the first delay calculation modules comprises:
  a cross-correlation module for generating a set of cross-correlation values from the at least one first characteristic feature extracted from the first input media signal and the at least one first characteristic feature extracted from the first output media signal; and
  a peak locator for determining a peak from the set of cross-correlation values.

31. The system of claim 30 wherein the first delay calculation modules further comprise a filter for smoothing the signal delay.

32. The system of claim 17 wherein the synchronization error module comprises a filter for smoothing the synchronization signal.

* * * * *